US012158039B2

(12) United States Patent
Wang

(10) Patent No.: US 12,158,039 B2
(45) Date of Patent: Dec. 3, 2024

(54) ADAPTING SLEEVE OF FENCE DOOR

(71) Applicant: DEMBY DEVELOPMENT CO., LTD., New Taipei (TW)

(72) Inventor: Tsung-Hsiang Wang, New Taipei (TW)

(73) Assignee: DEMBY DEVELOPMENT CO., LTD., New Taipei (TW)

( * ) Notice: Subject to any disclaimer, the term of this patent is extended or adjusted under 35 U.S.C. 154(b) by 441 days.

(21) Appl. No.: 17/720,429

(22) Filed: Apr. 14, 2022

(65) Prior Publication Data

US 2023/0332467 A1 Oct. 19, 2023

(51) Int. Cl.
*E06B 11/02* (2006.01)

(52) U.S. Cl.
CPC .................................... *E06B 11/02* (2013.01)

(58) Field of Classification Search
CPC ...... E06B 11/02; E06B 11/022; E06B 11/027; E06B 2009/002; E04H 17/013; E04H 17/1413; E04H 17/1447; E04H 17/1448; E04H 17/1488; E04H 17/17; E04H 17/18
See application file for complete search history.

(56) References Cited

U.S. PATENT DOCUMENTS 6,176,042 B1 * 1/2001 Rossman .................. E06B 9/04 49/57
8,341,886 B2 * 1/2013 Yates ........................ E06B 9/04 49/63
8,615,928 B2 * 12/2013 Wang .................... E04H 17/013 49/55
9,963,932 B2 * 5/2018 Wang ........................ E05C 5/04
10,683,700 B2 * 6/2020 Wang .................. E05B 65/0007
11,072,973 B2 * 7/2021 Flannery ................... E06B 9/04
11,118,398 B2 * 9/2021 Kaiser ....................... E06B 9/04
11,377,886 B1 * 7/2022 Flannery ................. E05B 1/003
11,608,675 B2 * 3/2023 Wang .................. E05B 65/0014
11,639,630 B1 * 5/2023 Flannery .............. A47D 13/065 160/130
11,946,315 B2 * 4/2024 Wang ........................ E06B 9/00
2002/0007597 A1 * 1/2002 Wang ........................ E06B 9/04 49/463
2023/0203878 A1 * 6/2023 Wang ........................ E06B 9/02 160/84.06

FOREIGN PATENT DOCUMENTS

CN 213980601 U 8/2021

* cited by examiner

*Primary Examiner* — Jonathan P Masinick
(74) *Attorney, Agent, or Firm* — Best & Flanagan LLP

(57) ABSTRACT

An adapting sleeve has a main body segment, a rod passage, a tightening recess, and an abutting wall segment. The main body segment is adapted to be mounted in a tube segment of a fence door. The rod passage is formed through the main body segment for connecting a width adjusting rod of the fence door. The tightening recess is formed on an outer surface of the main body segment for connecting a tightening unit of the fence door. The abutting wall segment is located between the tightening recess and the rod passage. A thickness of the abutting wall segment is larger than a gap between the width adjusting rod and an inner surface of the rod passage. A material hardness of the abutting wall segment is lower than that of the width adjusting rod. The tightening unit abuts the width adjusting rod via the abutting wall segment.

10 Claims, 6 Drawing Sheets

ADAPTING SLEEVE OF FENCE DOOR

1. FIELD OF THE INVENTION

The present invention relates to an adapting sleeve of a fence door, especially to an adapting sleeve that adapts a width adjusting rod of a fence door.

2. DESCRIPTION OF THE PRIOR ARTS

A conventional fence door as disclosed in China patent number CN 213980601 U has a frame and two width adjusting rods. The two width adjusting rods are axially movably mounted in two ends of a tube segment of the frame to adjust the width of the fence door.

However, each of the two width adjusting rods is fixed with the tube segment by a screw mounted through a tube wall of the tube segment and tightly abutting the width adjusting rod. Thus, the screw might scratch the width adjusting rod and leave scratches and broken pieces on the surface of the width adjusting rod, which is unsightly and might hurt people during operating.

To overcome the shortcomings, the present invention provides an adapting sleeve of a fence door to mitigate or obviate the aforementioned problems.

SUMMARY OF THE INVENTION

The main objective of the present invention is to provide an adapting sleeve of a fence door that has an abutting wall segment located between the tightening unit and the width adjusting rod, such that the tightening unit will not scratch the width adjusting rod.

The adapting sleeve of a fence door is adapted to connect a tube segment of a fence door, a width adjusting rod, and a tightening unit. The adapting sleeve of a fence door has a main body segment, a rod passage, a tightening recess, and an abutting wall segment. The main body segment is adapted to be mounted in the tube segment of the fence door. The rod passage is formed through the main body segment. The width adjusting rod is adapted to be axially movably mounted through the rod passage. The tightening recess is formed on an outer surface of the main body segment. The tightening unit is adapted to be mounted in the tightening recess. An abutting wall segment is formed on the main body segment and is located between the tightening recess and the rod passage. A thickness of the abutting wall segment is larger than a gap between the width adjusting rod and an inner surface of the rod passage. A material hardness of the abutting wall segment is lower than a material hardness of the width adjusting rod. The tightening unit is adapted to abut the width adjusting rod via the abutting wall segment.

When in use, the main body segment is mounted in the tube segment of the fence door, the width adjusting rod is axially movably mounted through the rod passage, and the tightening unit is mounted in the tightening recess. When the width adjusting rod and the tube segment need to be fixed, the tightening unit is rotated and moves in the tightening recess toward the abutting wall segment. After the tightening unit abuts the abutting wall segment, the tightening unit is further rotated to push the abutting wall segment and separate the abutting wall segment and the main body segment, so that the abutting wall segment can be detached from the main body segment and then abut the width adjusting rod. As a result, the tightening unit abuts the width adjusting rod via the abutting wall segment detached from the main body segment.

Since the material hardness of the abutting wall is lower than the material hardness of the width adjusting rod, when the tightening unit abuts the width adjusting rod via the abutting wall segment to fix the width adjusting rod and the tube segment, the abutting wall segment will not scratch the width adjusting rod and leave scratches and broken pieces on the surface of the width adjusting rod, thereby keeping the appealing appearance and avoiding hurting people.

Besides, since the thickness of the abutting wall segment is larger than the gap between the width adjusting rod and the inner surface of the rod passage, the abutting wall segment will still be limited between the width adjusting rod, the tightening unit, and an inner wall of the tightening recess, such that the abutting wall segment will not fall off from the gap even if the tightening unit is loosened.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
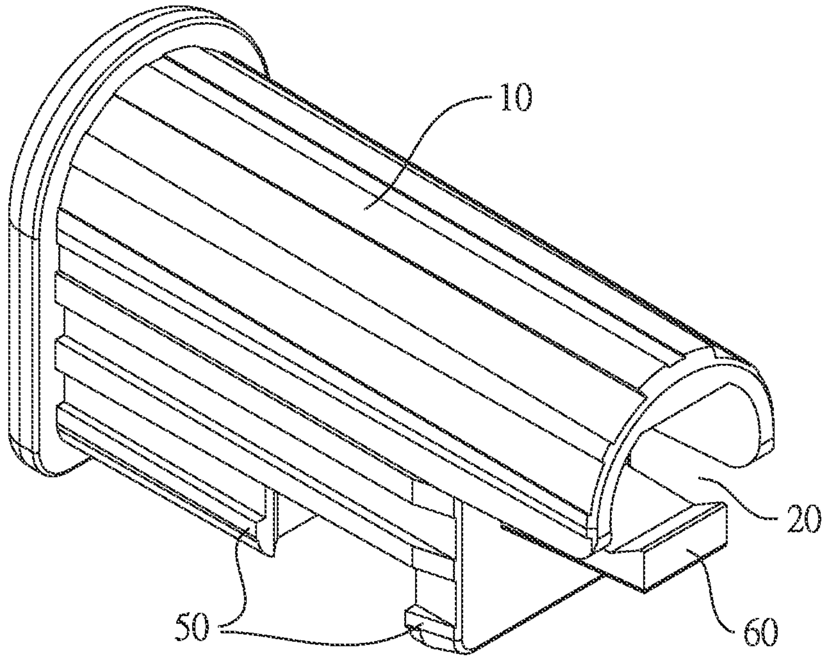
FIG. 1 is a perspective view of an adapting sleeve of a fence door in accordance with the present invention.
Figure 2:
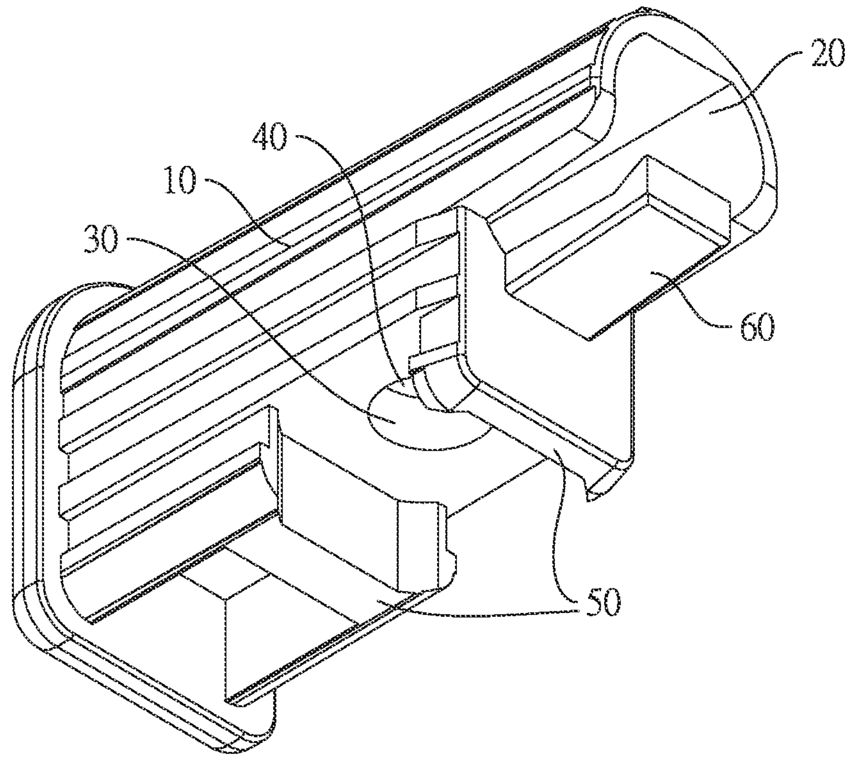
FIG. 2 is another perspective view of the adapting sleeve of a fence door in FIG. 1.
Figure 3:
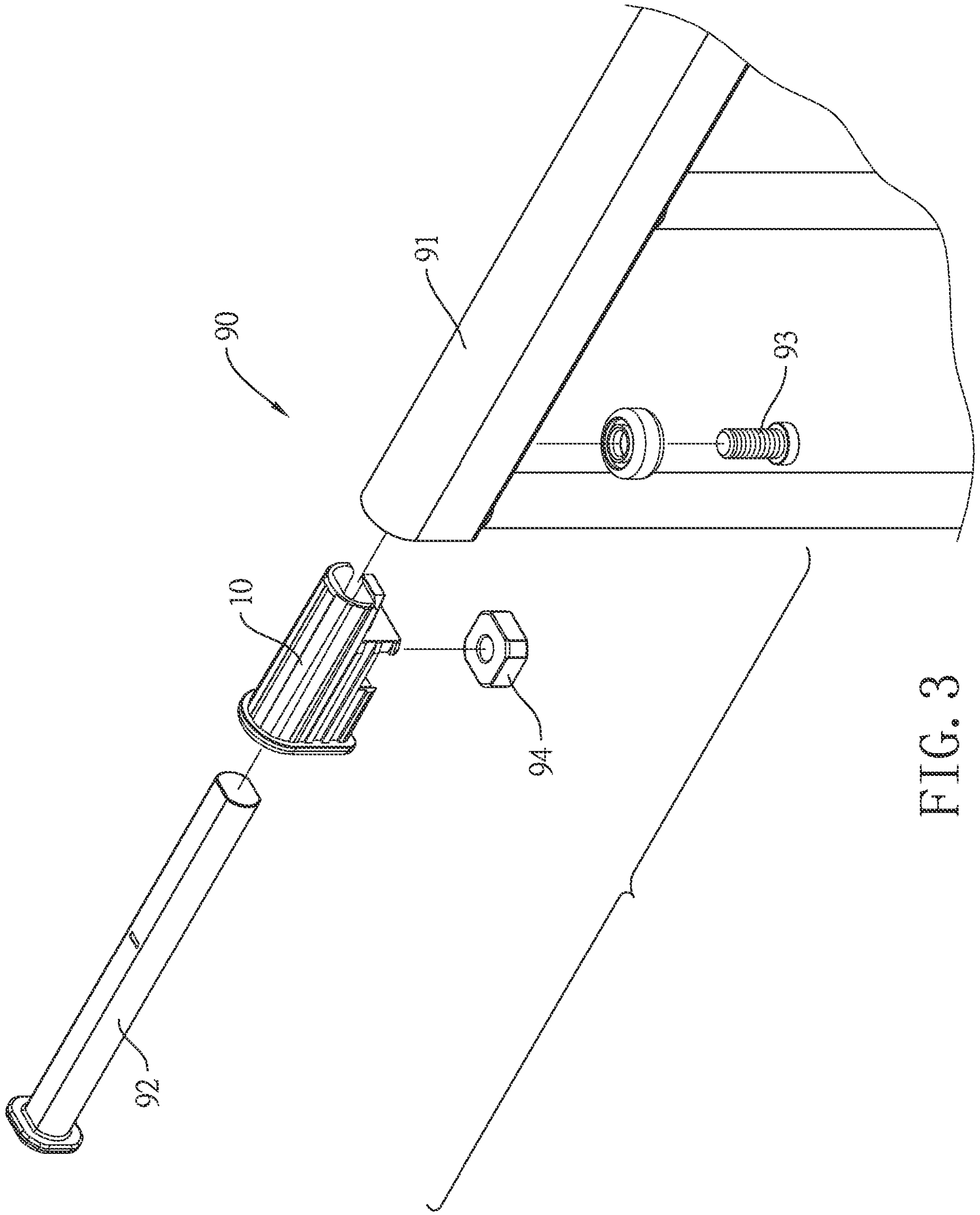
FIG. 3 is an exploded view of the adapting sleeve of a fence door in FIG. 1, showing the adapting sleeve and the other parts of the fence door.

With reference to FIGS. 1, 2, and 3, an adapting sleeve of a fence door in accordance with the present invention is adapted to connect a tube segment 91 of a fence door 90, a width adjusting rod 92, and a tightening unit 93 (such as a screw). In this embodiment, the adapting sleeve of a fence door comprises a main body segment 10, a rod passage 20, a tightening recess 30, an abutting wall segment 40, a nut engaging wall segment 50, and an abutting elastic sheet segment 60.

Figure 4:
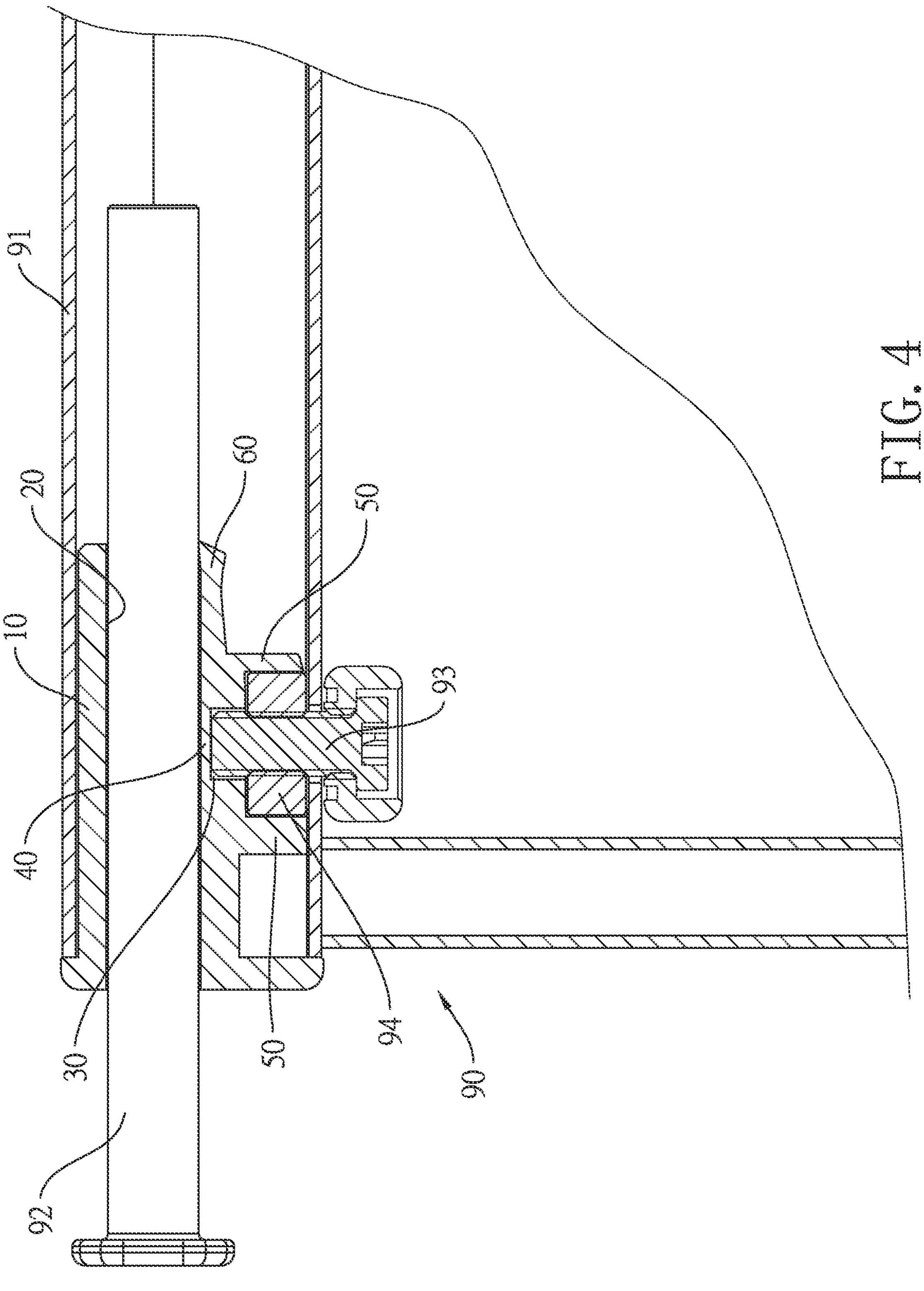
FIG. 4 is a side view in cross-section of the adapting sleeve of a fence door in FIG. 1, showing the adapting sleeve connected to a tube segment, a width adjusting rod, and a tightening unit of the fence door.
Figure 5:
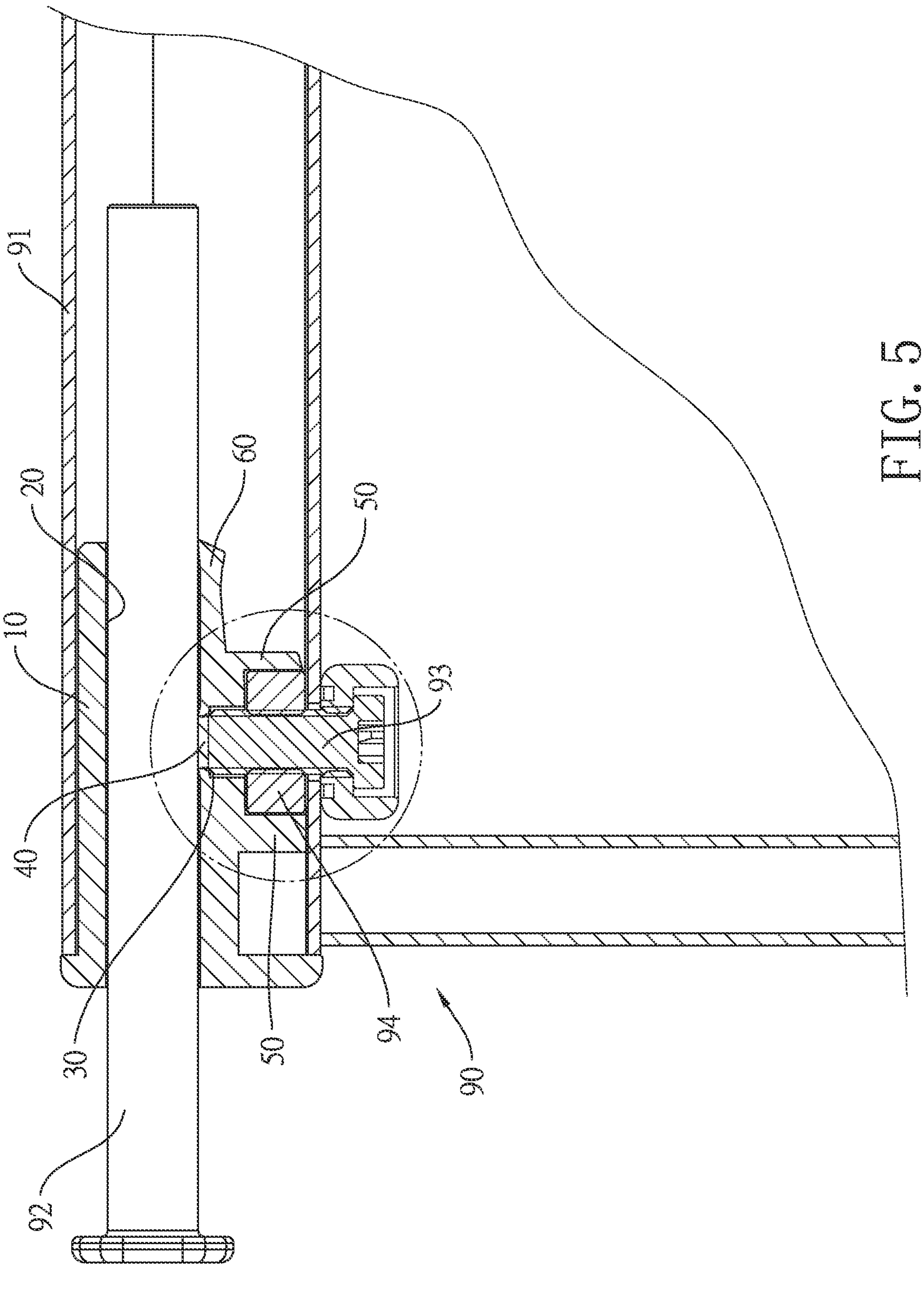
FIG. 5 is another side view in cross-section of the adapting sleeve of a fence door in FIG. 1, showing operation of the tightening unit and the abutting wall segment.
Figure 6:
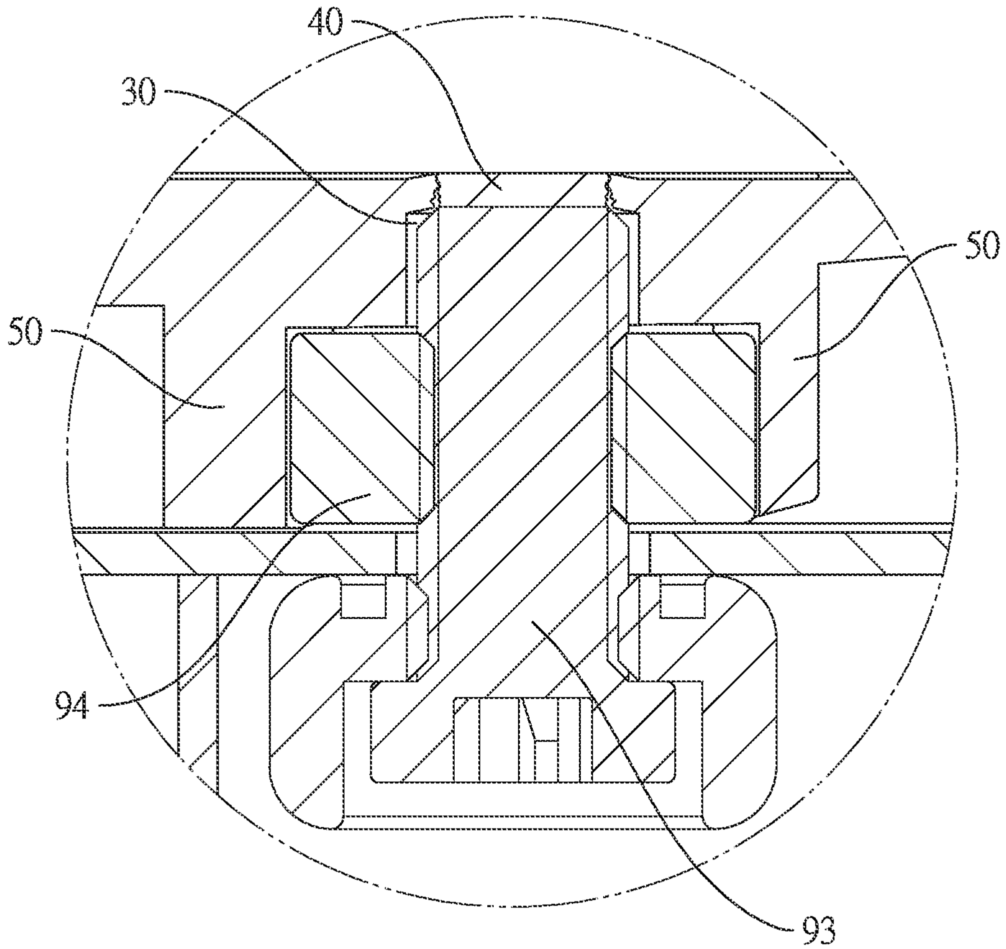
FIG. 6 is a partial enlarged view of the adapting sleeve of a fence door in FIG. 5.

With reference to FIGS. 3, 4, and 5, the main body segment 10 is adapted to be mounted in the tube segment 91 of the fence door 90.

The rod passage 20 is formed through the main body segment 10. The width adjusting rod 92 is adapted to be axially movably mounted through the rod passage 20.

The tightening recess 30 is formed on an outer surface of the main body segment 10. The tightening unit 93 is adapted to be mounted in the tightening recess 30.

With reference to FIGS. 1 to 6, the abutting wall segment 40 is formed on the main body segment 10 and is located between the tightening recess 30 and the rod passage 20. A thickness of the abutting wall segment 40 is larger than a gap between the width adjusting rod 92 and an inner surface of the rod passage 20. A material hardness of the abutting wall segment 40 is lower than a material hardness of the width adjusting rod 92. Specifically, in a preferred embodiment, the abutting wall segment 40 can be made of, but not limited to, plastic or rubber. The tightening unit 93 is adapted to abut the width adjusting rod 92 via the abutting wall segment 40.

The nut engaging wall segment 50 is formed on the outer surface of the main body segment 10 and is located around the tightening recess 30. The nut engaging wall segment 50 is adapted to engage with a nut 94, such that the tightening unit 93 can be screwed with the nut 94 to move toward or away from the abutting wall segment 40. But in other embodiments, the adapting sleeve of a fence door can also be implemented without the nut engaging wall segment 50, and in such embodiment, the tightening unit 93 can be screwed with the tightening recess 30 to achieve the same purpose.

The abutting elastic sheet segment 60 is located at an end of the rod passage 20 and extends radially inward to an axis of the rod passage 20. The abutting elastic sheet segment 60 is adapted to abut the width adjusting rod 92 to preliminarily tighten and position the width adjusting rod 92 before the tightening unit 93 is tightened. But the configuration of the abutting elastic sheet segment 60 is not necessary in other embodiments.

Preferably, in this embodiment, the main body segment 10, the abutting wall, the nut engaging wall segment 50, and the abutting elastic sheet segment 60 are all formed integrally. But in other embodiments, those parts can all be independent from each other.

When in use, the main body segment 10 is mounted in the tube segment 91 of the fence door 90, the width adjusting rod 92 is axially movably mounted through the rod passage 20, and the tightening unit 93 is mounted in the tightening recess 30. When the width adjusting rod 92 and the tube segment 91 need to be fixed, the tightening unit 93 is rotated and moves in the tightening recess 30 toward the abutting wall segment 40. After the tightening unit 93 abuts the abutting wall segment 40, the tightening unit 93 is further rotated to push the abutting wall segment 40 and separate the abutting wall segment 40 and the main body segment 10, so that the abutting wall segment 40 can be detached from the main body segment 10 and then abut the width adjusting rod 92. As a result, the tightening unit 93 abuts the width adjusting rod 92 via the abutting wall segment 40 detached from the main body segment 10.

Since the material hardness of the abutting wall is lower than the material hardness of the width adjusting rod 92, when the tightening unit 93 abuts the width adjusting rod 92 via the abutting wall segment 40 to fix the width adjusting rod 92 and the tube segment 91, the abutting wall segment 40 will not scratch the width adjusting rod 92 and leave scratches and broken pieces on the surface of the width adjusting rod 92, thereby keeping the appealing appearance and avoiding hurting people.

Besides, since the thickness of the abutting wall segment 40 is larger than the gap between the width adjusting rod 92 and the inner surface of the rod passage 20, the abutting wall segment 40 will still be limited between the width adjusting rod 92, the tightening unit 93, and an inner wall of the tightening recess 30, such that the abutting wall segment 40 will not fall off from the gap even if the tightening unit 93 is loosened.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adapting sleeve of a fence door adapted to connect a tube segment, a width adjusting rod, and a tightening unit of the fence door; the adapting sleeve comprising:

a main body segment adapted to be mounted in the tube segment of the fence door;

a rod passage formed through the main body segment; the width adjusting rod adapted to be axially movably mounted through the rod passage;

a tightening recess formed on an outer surface of the main body segment; the tightening unit adapted to be mounted in the tightening recess; and an abutting wall segment formed on the main body segment and located between the tightening recess and the rod passage; a thickness of the abutting wall segment being larger than a gap between the width adjusting rod and an inner surface of the rod passage; a material hardness of the abutting wall segment being lower than a material hardness of the width adjusting rod; the tightening unit adapted to abut the width adjusting rod via the abutting wall segment.

2. The adapting sleeve of a fence door as claimed in claim 1, wherein the adapting sleeve has a nut engaging wall segment formed on the outer surface of the main body segment and located around the tightening recess; the nut engaging wall segment adapted to engage with a nut.

3. The adapting sleeve of a fence door as claimed in claim 2, wherein the adapting sleeve has an abutting elastic sheet segment located at an end of the rod passage and extending radially inward to an axis of the rod passage; the abutting elastic sheet segment adapted to abut the width adjusting rod.

4. The adapting sleeve of a fence door as claimed in claim 3, wherein the main body segment, the abutting wall segment, the nut engaging wall segment, and the abutting elastic sheet segment are formed integrally.

5. The adapting sleeve of a fence door as claimed in claim 4, wherein the abutting wall segment is made of plastic.

6. The adapting sleeve of a fence door as claimed in claim 5, wherein the abutting wall segment is made of rubber.

7. The adapting sleeve of a fence door as claimed in claim 1, wherein the adapting sleeve has an abutting elastic sheet segment located at an end of the rod passage and extending radially inward to an axis of the rod passage; the abutting elastic sheet segment adapted to abut the width adjusting rod.

8. The adapting sleeve of a fence door as claimed in claim 1, wherein the main body segment and the abutting wall segment are formed integrally.

9. The adapting sleeve of a fence door as claimed in claim 1, wherein the abutting wall segment is made of plastic.

10. The adapting sleeve of a fence door as claimed in claim 1, wherein the abutting wall segment is made of rubber.

* * * * *